M. J. B. BARBAROU.
FOOT LEVER CONSTRUCTION FOR MOTOR CARS.
APPLICATION FILED SEPT. 21, 1920.

1,385,331.

Patented July 19, 1921.

INVENTOR:
Marius, Jean, Baptiste, Barbarou.

By

His ATTORNEY.

UNITED STATES PATENT OFFICE.

MARIUS JEAN BAPTISTE BARBAROU, OF PARIS, FRANCE.

FOOT-LEVER CONSTRUCTION FOR MOTOR-CARS.

1,385,331.  Specification of Letters Patent.  Patented July 19, 1921.

Application filed September 21, 1920. Serial No. 411,829.

*To all whom it may concern:*

Be it known that I, MARIUS JEAN BAPTISTE BARBAROU, citizen of the French Republic, residing at Paris, in the Republic of France, have invented new and useful Improvements in Foot-Lever Constructions for Motor-Cars, of which the following is a specification.

This invention relates to foot lever constructions for motor vehicles embodying one pedal adapted to actuate the clutch device and another pedal for actuating the brakes.

According to the invention the spindle of one of the pedals rotates in a bushing which is secured to the motor vehicle and the other pedal rotates freely about said bushing whereby the pedals while rotating about the same axis are not liable to be carried around one by the other.

Other features of the invention will appear from the following specification.

In the accompanying drawing given by way of example:

Figure 1:
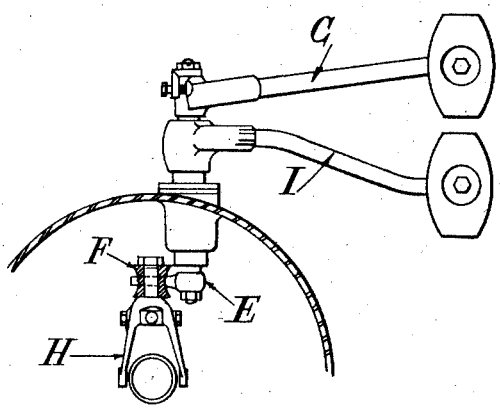
Figure 1 shows the pedal device in plan view.
Figure 3:
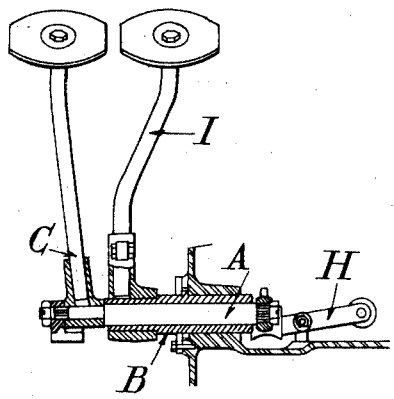
Fig. 3 shows a section through the shaft.
Figure 2:
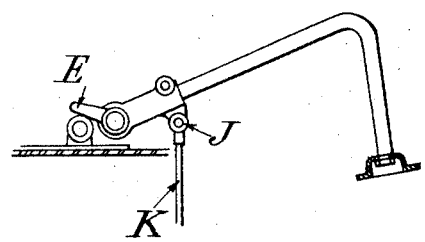
Fig. 2 represents a partial side view.

The improved device is essentially constituted by a shaft or spindle A which rotates within a sleeve or bushing B and carries at one end a pedal C and at the other end a lever arm E.

Under the action of the pedal C, the lever E bears upon a roller F and thus acts upon a fork H actuating the sleeve of the clutch.

A second pedal I rotates loosely upon the sleeve B and is provided at J with an aperture having pivoted thereto a rod K which at its other end actuates the members operating the brakes.

Having now described my invention what I claim as new and desire to secure by Letters Patent is:

1. A foot lever construction for motor cars comprising in combination a bushing adapted to be secured to the vehicle, a pedal spindle rotatably mounted in said bushing, a pedal secured on said spindle, a brake actuating pedal rotatably mounted on said bushing and means operated by said spindle for operating the clutch device.

2. A foot lever construction for motor cars comprising in combination a bushing adapted to be secured to the vehicle, a pedal spindle rotatably mounted in said bushing, a pedal secured on said spindle, a brake actuating pedal rotatably mounted on said bushing, a lever arm secured to said spindle, a pivoted clutch actuating fork and a roller carried on said fork and adapted to engage the said lever arm.

In testimony whereof I have signed my name to this specification.

MARIUS JEAN BAPTISTE BARBAROU.